(12) United States Patent
Kobori et al.

(10) Patent No.: US 8,259,654 B2
(45) Date of Patent: Sep. 4, 2012

(54) WIRELESS BASE STATION APPARATUS, FREQUENCY DEVIATION DETECTING METHOD, AND MOBILE COMMUNICATION SYSTEM

(75) Inventors: Satoshi Kobori, Kawasaki (JP); Noriyuki Kawaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 12/839,010

(22) Filed: Jul. 19, 2010

(65) Prior Publication Data
US 2010/0278115 A1    Nov. 4, 2010

Related U.S. Application Data

(63) Continuation of application No. PCT/JP2008/053241, filed on Feb. 26, 2008.

(51) Int. Cl.
*H04W 4/00* (2009.01)
*H04B 1/00* (2006.01)
(52) U.S. Cl. .......................... 370/328; 375/150
(58) Field of Classification Search ............... None
See application file for complete search history.

(56) References Cited

U.S. PATENT DOCUMENTS

| | | | | |
|---|---|---|---|---|
| 6,144,709 | A * | 11/2000 | Piirainen et al. | 375/343 |
| 7,072,384 | B2 | 7/2006 | Tanaka | |
| 2003/0058972 | A1 | 3/2003 | Iochi | |
| 2009/0180525 | A1* | 7/2009 | Kobayashi et al. | 375/150 |
| 2010/0248743 | A1* | 9/2010 | Kawasaki | 455/456.1 |

FOREIGN PATENT DOCUMENTS

| | | |
|---|---|---|
| JP | 08335926 | 12/1996 |
| JP | 2002217866 | 8/2002 |
| JP | 2003152600 | 5/2003 |
| JP | 2003258925 | 9/2003 |
| JP | 3522631 | 2/2004 |
| JP | 2004274317 | 9/2004 |
| JP | 2006135554 | 5/2006 |

OTHER PUBLICATIONS

International Search Report dated Apr. 8, 2008 in corresponding International application No. PCT/JP2008/053241.

* cited by examiner

*Primary Examiner* — Clemence Han
(74) *Attorney, Agent, or Firm* — Murphy & King, P.C.

(57) ABSTRACT

A wireless base station apparatus includes a path detecting unit configured to detect a preamble signal sent from a terminal and obtain a back-diffusion timing; a back-diffusion unit configured to execute back-diffusion processing on a message signal sent from the terminal, by using the back-diffusion timing reported from the path detecting unit; and a calculating unit configured to calculate a frequency deviation of the message signal that has been subjected to the back-diffusion processing, based on a pilot signal of the message signal that has been subjected to the back-diffusion processing. The path detecting unit includes an information detecting unit configured to detect a frequency deviation of the preamble signal when detecting the preamble signal and supply the frequency deviation of the preamble signal to the calculating unit as initial value information. The calculating unit includes an information adding unit that calculates the frequency deviation of the message signal by using the initial value information.

9 Claims, 16 Drawing Sheets

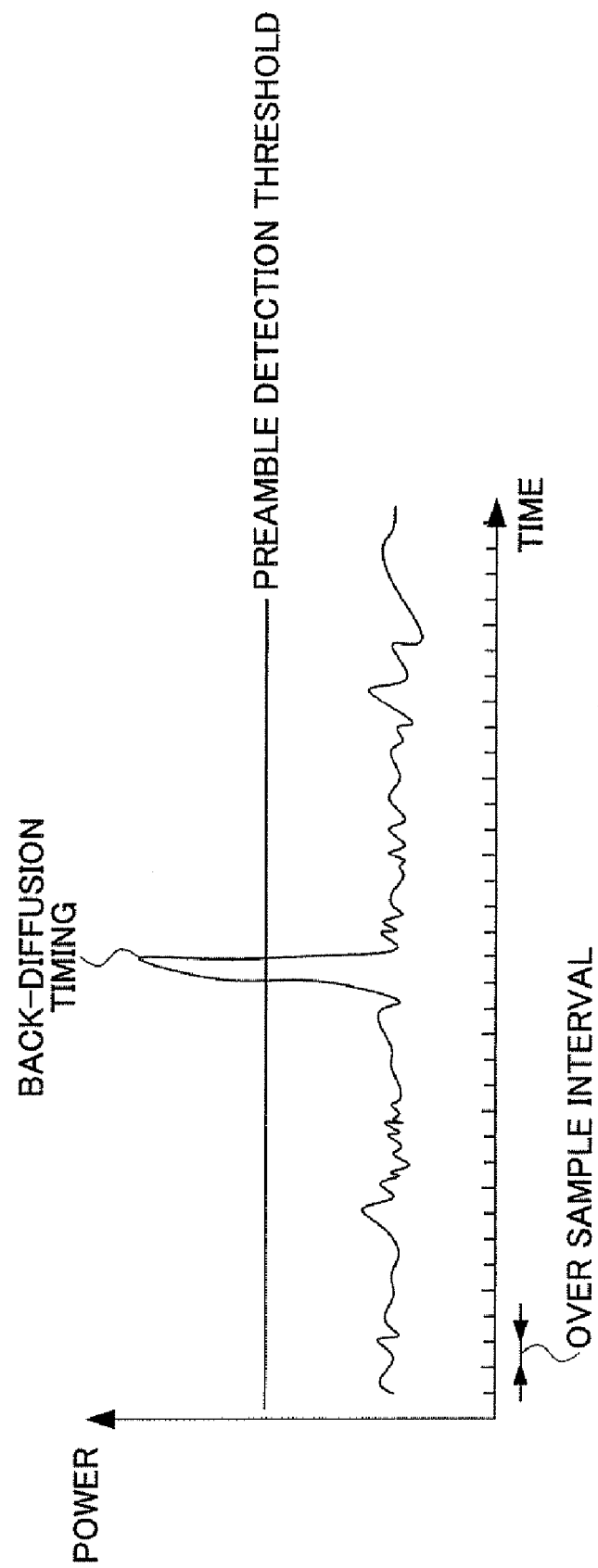

FIG.8A
FIG.8B
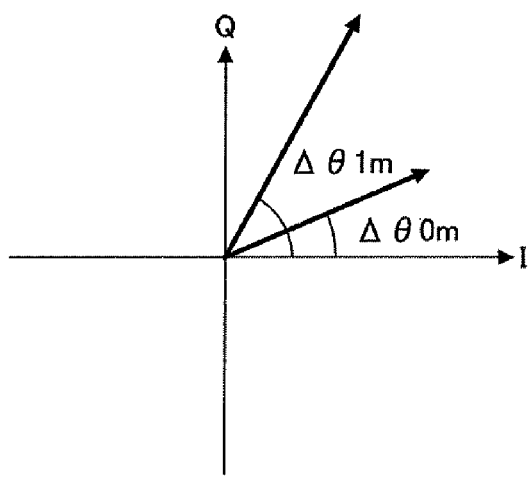
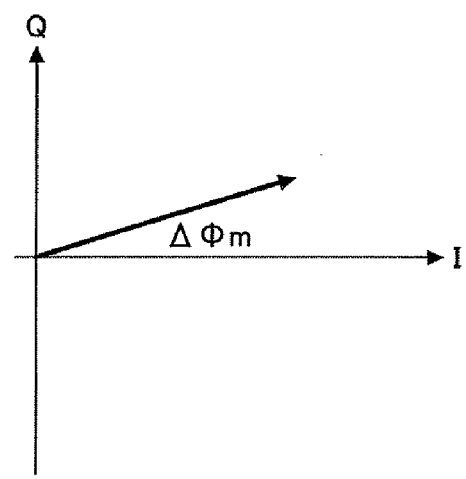

WIRELESS BASE STATION APPARATUS, FREQUENCY DEVIATION DETECTING METHOD, AND MOBILE COMMUNICATION SYSTEM

CROSS-REFERENCE TO RELATED APPLICATIONS

This patent application is based upon and claims the benefit of priority under 35 USC 120 and 365(c) of PCT application JP2008/053241 filed in Japan on Feb. 26, 2008, the entire contents of which are incorporated herein by reference.

FIELD

The embodiments discussed herein are related to a wireless base station apparatus, a frequency deviation detecting method, and a mobile communication system.

BACKGROUND

Japanese Laid-Open Patent Application No. 2003-152600 describes a method of preventing fixed pattern detection properties from degrading when there is a frequency drift in the received signals.

Japanese Laid-Open Patent Application No. 2004-274317 describes an apparatus and a method for generating a display profile adapted to the phase variation of each burst signal, so that control operations may be adapted to the propagation environment.

Japanese Laid-Open Patent Application No. 2003-258925 describes a method of detecting a preamble with the use of two types of detectors, i.e., a synchronous detector and an asynchronous detector.

Japanese Patent No. 3522631 describes a method of correcting frequency offset by detecting Doppler frequency with high precision, while reducing an increase in the quantity of arithmetic operations, even for signals that are transmitted in bursts.

SUMMARY

According to an aspect of the invention, a wireless base station apparatus includes a path detecting unit configured to detect a preamble signal sent from a terminal and obtain a back-diffusion timing; a back-diffusion unit configured to execute back-diffusion processing on a message signal sent from the terminal, by using the back-diffusion timing reported from the path detecting unit; and a calculating unit configured to calculate a frequency deviation of the message signal that has been subjected to the back-diffusion processing, based on a pilot signal of the message signal that has been subjected to the back-diffusion processing, wherein the path detecting unit comprises an initial value information detecting unit configured to detect a frequency deviation of the preamble signal when the preamble signal is detected and supply the frequency deviation of the preamble signal to the calculating unit as initial value information, and the calculating unit comprises an initial value information adding unit that calculates the frequency deviation of the message signal by using the initial value information.

According to an aspect of the invention, a frequency deviation detecting method includes detecting a preamble signal sent from a terminal and obtaining a back-diffusion timing; executing back-diffusion processing on a message signal sent from the terminal, by using the back-diffusion timing; and calculating a frequency deviation of the message signal that has been subjected to the back-diffusion processing, based on a pilot signal of the message signal that has been subjected to the back-diffusion processing, wherein the detecting comprises detecting a frequency deviation of the preamble signal when the preamble signal is detected and setting the frequency deviation of the preamble signal as initial value information, and the calculating comprises calculating the frequency deviation of the message signal by using the initial value information.

According to an aspect of the invention, a mobile communication system includes a wireless base station apparatus, the wireless base station apparatus including a path detecting unit configured to detect a preamble signal sent from a terminal and obtain a back-diffusion timing; a back-diffusion unit configured to execute back-diffusion processing on a message signal sent from the terminal, by using the back-diffusion timing reported from the path detecting unit; and a calculating unit configured to calculate a frequency deviation of the message signal that has been subjected to the back-diffusion processing, based on a pilot signal of the message signal that has been subjected to the back-diffusion processing, wherein the path detecting unit comprises an initial value information detecting unit configured to detect a frequency deviation of the preamble signal when the preamble signal is detected and supply the frequency deviation of the preamble signal to the calculating unit as initial value information, and the calculating unit comprises an initial value information adding unit that calculates the frequency deviation of the message signal by using the initial value information.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 7 illustrates an example of a preamble profile;

FIGS. 8A and 8B illustrate a concept of amplitude information $\Delta\theta 0m$ and $\Delta\theta 1m$ and a frequency deviation $\Delta\Phi m$;

DESCRIPTION OF EMBODIMENTS

In a mobile communication system of a WCDMA (Wideband-Code Division Multiple Access) method, the following problem may arise. In the uplink, the properties of receiving signals are degraded due to a frequency shift between an oscillator that is used as a standard for transmitting signals from a terminal (UE: User equipment) and an oscillator used as a standard for receiving the signals at a wireless base station (BTS: Base Transceiver Station). In the downlink, the properties of the receiving side are degraded due to a frequency shift between an oscillator that is used as a standard for transmitting signals from a wireless base station and an oscillator used as a standard for receiving the signals at a terminal. Furthermore, the properties of the receiving side are degraded due to a frequency deviation caused by Doppler shift that may occur when the terminal moves. In order to mitigate such factors that degrade the properties and to improve performance, AFC (Automatic Frequency Control) is typically implemented on the receiving side.

As a method of initially connecting the terminal to the wireless base station (BTS), transmission is performed with the RACH (Random Access Channel). PRACH (Physical Random Access Channel) is an uplink channel used for transferring short packets including control information. The wireless base station constantly monitors the RACH, and when signals are successfully received, transmission is performed with other channels used for voice communication and data communication.

Figure 1:
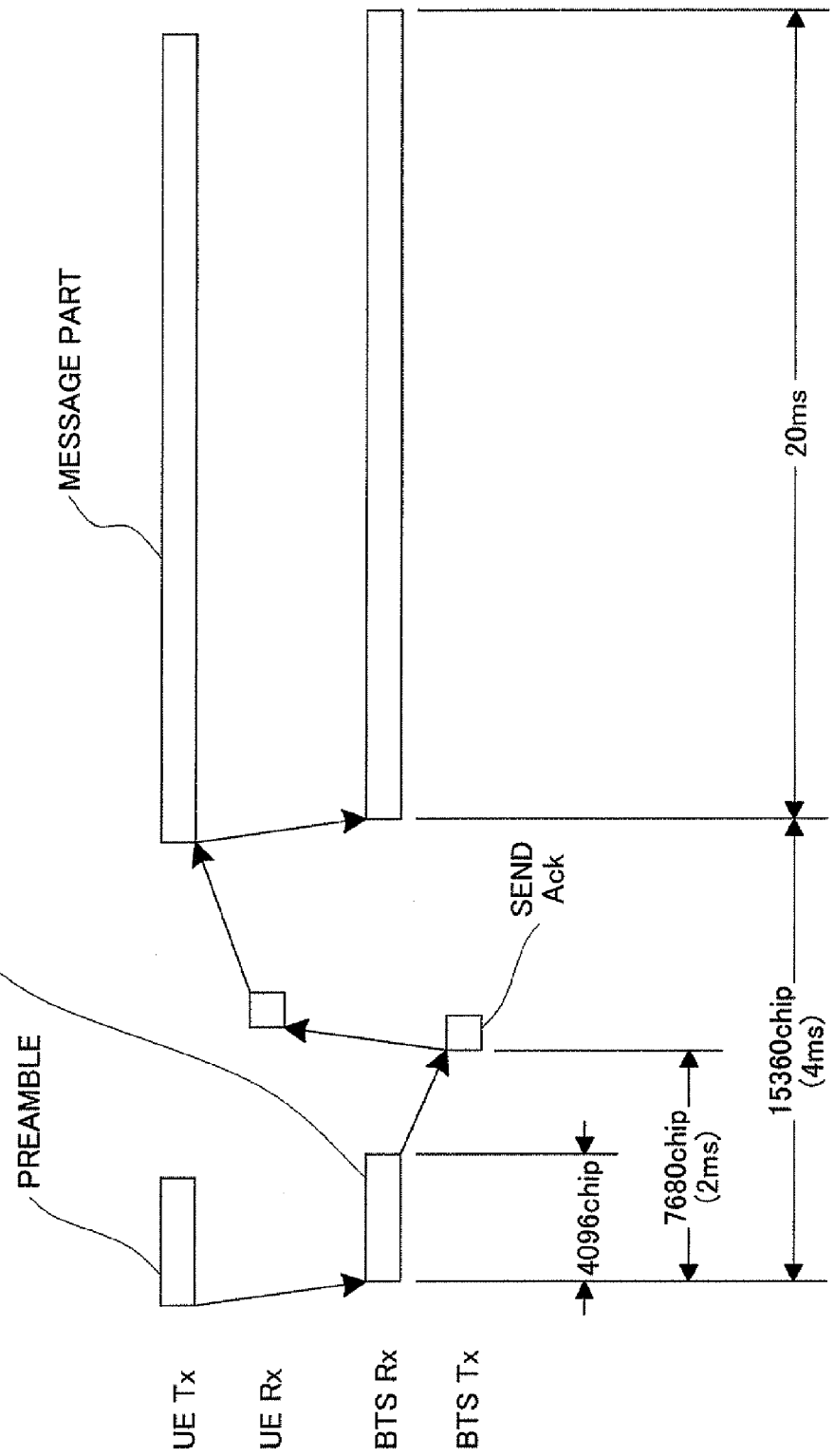
FIG. 1 illustrates an example of the timing for transmitting and receiving signals with PRACH.

FIG. 1 illustrates an example of the timing for transmitting and receiving signals with PRACH. The wireless base station first detects a preamble signal transmitted (Tx) from a terminal (UE). When the preamble signal is successfully detected, the wireless base station sends ACK information to the terminal. When the ACK information is received, the terminal sends a message in a packet including control information to the wireless base station.

When the wireless base station does not detect a preamble signal, i.e., when an ACK signal is not returned to the terminal, the wireless base station repetitively sends preamble signals to the terminal for a predetermined number of times. For example, the preamble signal is of length 4096 chips (1 chip is 3.84 MHz$^{-1}$), which is in a particular data pattern and diffused.

For example, the message signal is 20 ms, including a control part having a pilot signal of a particular data pattern, and a data part including control signal data. The message signal is also diffused.

For example, the time from when the leading edge of the preamble signal is received to when an ACK signal is sent is length 7680 chips. The time from when the preamble signal is received to when the message signal is sent is length 15360 chips. In the sending/receiving operations with RACH, at the wireless base station, the preamble signals and the message signals are both waves received from the same terminal. Furthermore, the intervals between the preamble signals and the message signals are small, and therefore frequency deviation and Doppler shift occur by substantially the same extent for both the preamble signals and the message signals.

The connection properties between the terminal and the wireless base station may be improved by improving the receiving properties of the wireless base station in RACH, and also by improving properties in correcting frequency deviation.

Figure 2:
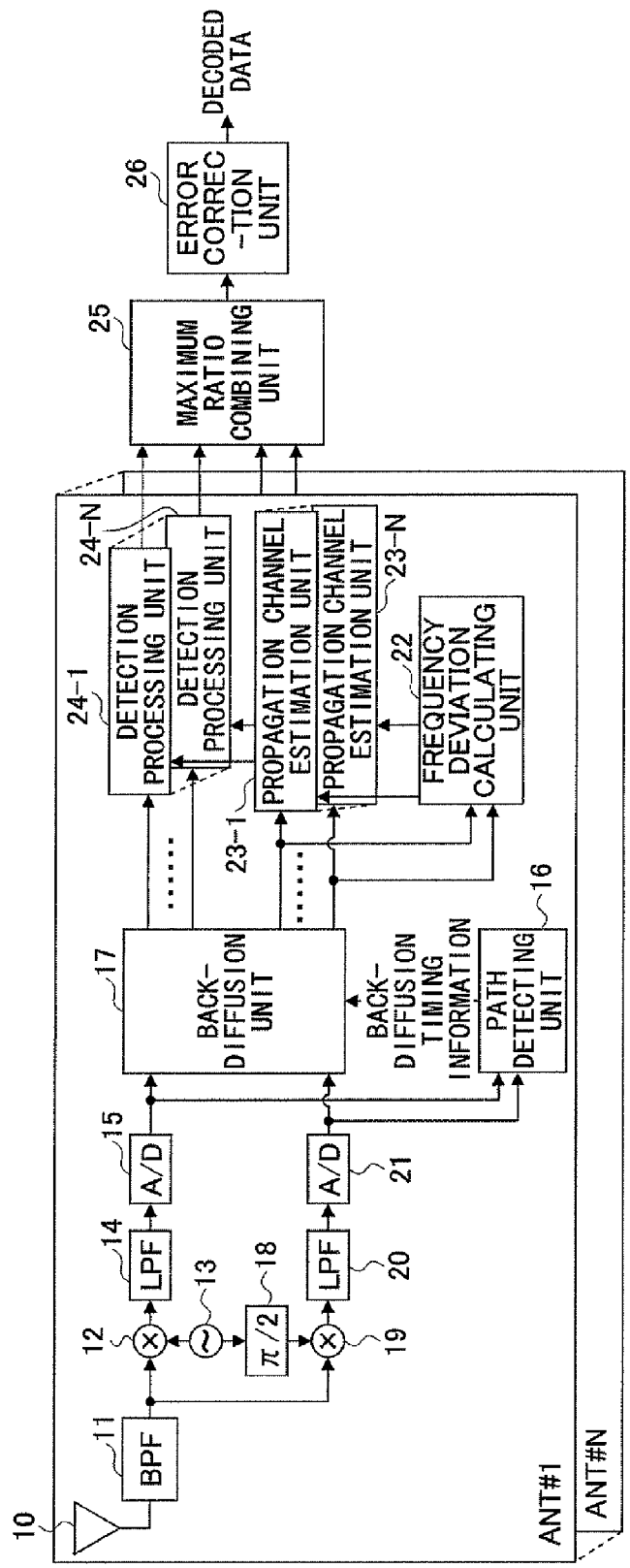
FIG. 2 is a block diagram of a conventional RACH receiving circuit.

FIG. 2 is a block diagram of a RACH receiving circuit in a base band receiving unit (BB unit) of a conventional wireless base station.

As illustrated in FIG. 2, the RACH receiving circuit is provided with plural antennas 10. The signals received by each antenna 10 are subjected to band limitation at a band pass filter 11, and are branched into two paths. Signals in one of the paths are supplied to a mixing unit 12 where they are mixed with oscillation signals from an oscillator 13, to be subjected to frequency conversion. The signals are then supplied to an A/D converting unit 15 through a low-pass filter 14, where they are digitized into I signals (real axis). The signals are then supplied to a path detecting unit 16 and a back-diffusion unit 17.

Oscillation signals from the oscillator 13 are subjected to phase shift by $\pi/2$ at a phase shifter 18. At a mixing unit 19, the signals in the other one of the above-described paths are mixed with the signals from the phase shifter 18, so that the frequency is converted. The signals output from the mixing unit 19 are then supplied to an A/D conversion unit 21 through a low-pass filter 20. The signals are digitized at the A/D conversion unit 21, and supplied to the path detecting unit 16 and the back-diffusion unit 17 as Q signals (imaginary axis).

The path detecting unit 16 performs a PRACH preamble detection process on the signals, and reports, to the back-diffusion unit 17, the back-diffusion timings of plural paths having different propagation channels. The back-diffusion timings are obtained when detecting the preamble signals. The preamble signals are obtained by performing a diffusion process on a particular data pattern. Therefore, the preamble may be detected by combining a matched filter with a pattern match detection circuit, for example.

The back-diffusion unit 17 performs a back-diffusion process on the PRACH message signals at the plural back-diffusion timings that have been reported from the path detecting unit 16. The signals, which have been subjected to the back-diffusion process at the respective timings, are then supplied to a frequency deviation calculating unit 22, plural propagation channel estimation units 23-1 through 23-N, and plural detection processing units 24-1 through 24-N.

The frequency deviation calculating unit 22 calculates the frequency deviation of message signals in order to perform frequency correction (AFC) in the base band. The information obtained as a result of the calculation is reported to the propagation channel estimation units 23-1 through 23-N.

The propagation channel estimation units 23-1 through 23-N use the frequency deviation information to generate propagation channel estimation information. The detection processing units 24-1 through 24-N perform synchronization detection with the use of the propagation channel estimation information from the propagation channel estimation units 23-1 through 23-N.

The output signals of the detection processing units 24-1 through 24-N are combined in a maximum ratio combining unit 25. The combined signals are subjected to error correction at an error correction unit 26, and are then output as decoded data.

Figure 3:
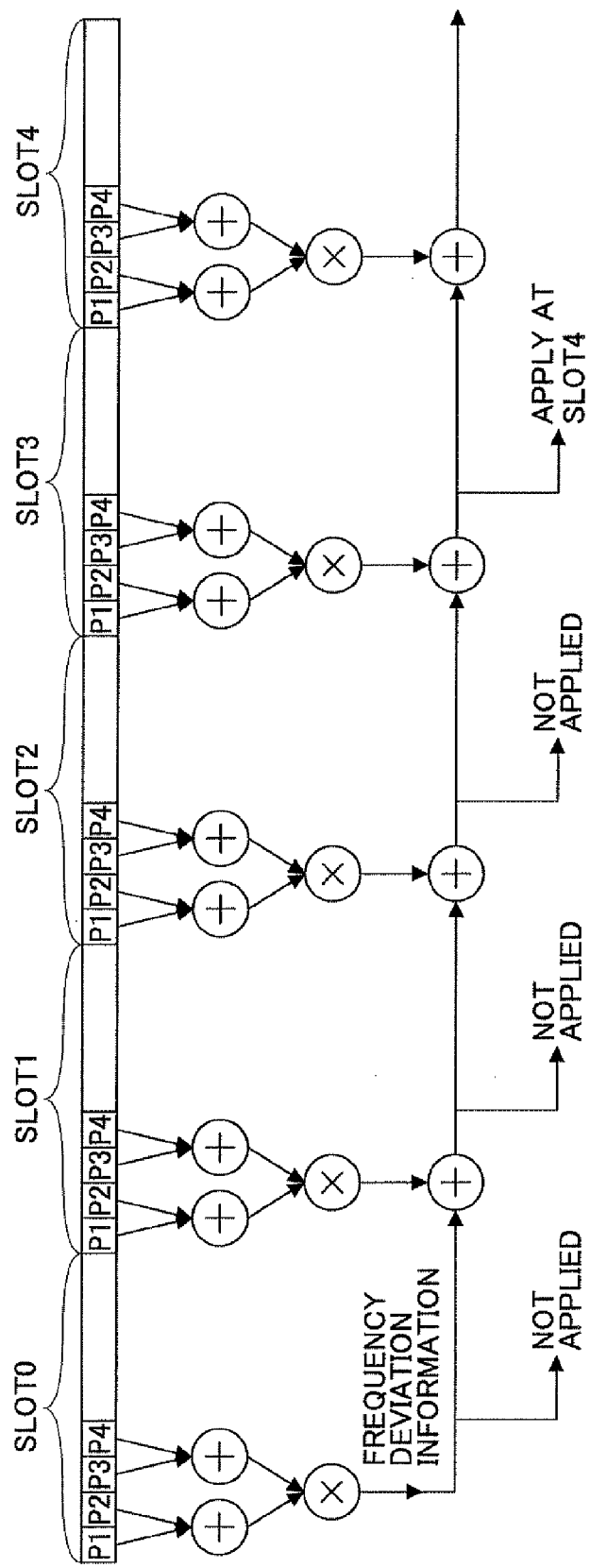
FIG. 3 illustrates an example of a circuit configuration for generating frequency deviation information.

FIG. 3 illustrates an example of a circuit configuration of the frequency deviation calculating unit 22. The frequency deviation calculating unit 22 is a circuit for generating frequency deviation information with the use of pilot signals of control parts of message signals, in order to perform AFC correction on the message signals.

As to the precision of estimating frequency deviation, when there are a large number of slots, the S/N is averaged with a high parameter, and therefore the detection precision becomes higher. That is to say, in a first slot of message signals, a small averaging parameter is used for detecting the frequency deviation, and therefore the frequency deviation may not be calculated with high precision.

Accordingly, in the conventional technology, although the frequency deviation is calculated from the first slot, the results obtained from the first slot are not applied to AFC correction. In the example illustrated in FIG. 3, the results obtained from the fourth slot onward are applied to AFC correction. This is to prevent erroneous detection due to noise.

When a preamble signal is detected, the path detecting unit 16 immediately needs to give an instruction for sending an ACK signal. Therefore, the information of the frequency deviation calculating unit 22 may not be applied.

Furthermore, even if a circuit like the frequency deviation calculating unit 22 is provided in the path detecting unit 16, the frequency correction information of the preamble signal would need to be calculated within a short period of time, and therefore the frequency correction may not be performed with high precision. Accordingly, in the case of a matched filter, the preamble signal that is of length 4096 chips is divided into plural signals, and amplitude accumulation is performed for each of the plural signals to correct the frequency deviation of the preamble signals.

In any case, in the conventional technology, the method of correcting the frequency deviation of preamble signals and the method of correcting frequency deviation for message signals are separately controlled.

In the conventional technology, methods have been proposed for mitigating the impact of frequency deviation and improving performance, by dividing the length of the preamble signal into plural segments. Specifically, these methods are performed when there is a large frequency deviation that is caused by Doppler shift of a high-speed mobile object, in particular, when there is a large frequency deviation that is caused by Doppler shift when a mobile object with a terminal passes by a wireless base station at high speed. Alternatively, these methods may be performed when there is a large frequency deviation caused by frequency shift between an oscillator on the sending side and an oscillator on the receiving side (see Japanese Laid-Open Patent Application No. 2003-152600, Japanese Laid-Open Patent Application No. 2004-274317, Japanese Laid-Open Patent Application No. 2003-258925, and Japanese Patent No. 3522631).

However, even if the frequency deviation properties of preamble signals are improved, the method of correcting the frequency deviation of preamble signals and the method of correcting frequency deviation for message signals are separately controlled. Thus, unless the properties of correcting the frequency deviation for message signals are improved in the same manner as the frequency deviation properties of preamble signals, the properties of the entire RACH may not be improved.

Preferred embodiments of the present invention will be explained with reference to accompanying drawings.

Figure 4:
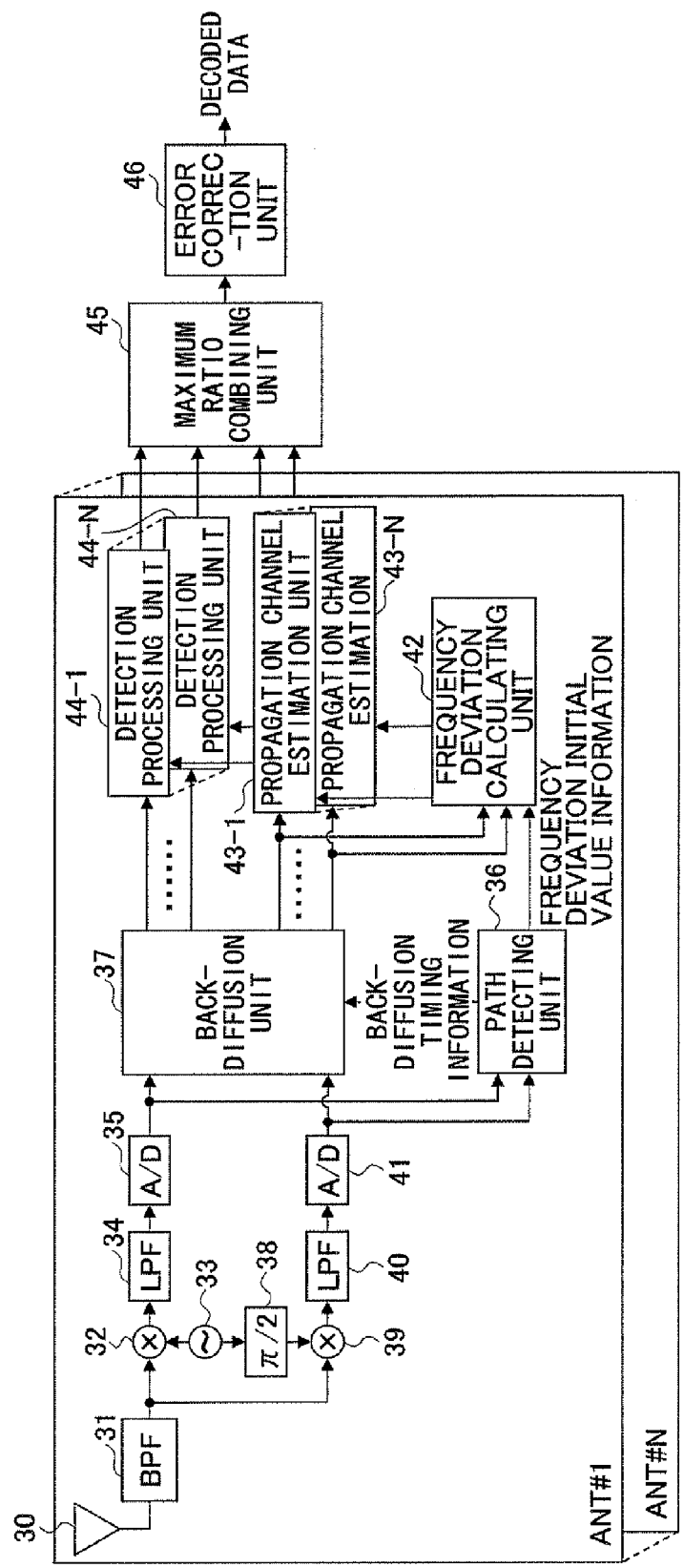
FIG. 4 is a block diagram of a RACH receiving circuit according to an embodiment of the present invention.

FIG. 4 is a block diagram of a RACH receiving circuit in a base band receiving unit (BB unit) of a wireless base station, according to an embodiment of the present invention.

As illustrated in FIG. 4, the RACH receiving circuit is provided with plural antennas 30. The signals received by each antenna 30 are subjected to band limitation at a band pass filter 31, and are branched into two paths. Signals in one of the paths are supplied to a mixing unit 32 where they are mixed with oscillation signals from an oscillator 33, to be subjected to frequency conversion. The signals are then supplied to an A/D converting unit 35 through a low-pass filter 34, where they are digitized into I signals (real axis). The signals are then supplied to a path detecting unit 36 and a back-diffusion unit 37.

Oscillation signals from the oscillator 33 are subjected to phase shift by $\pi/2$ at a phase shifter 38. At a mixing unit 39, the signals in the other one of the above-described paths are mixed with the signals from the phase shifter 38, so that the frequency is converted. The signals output from the mixing unit 39 are then supplied to an A/D conversion unit 41 through a low-pass filter 40. The signals are digitized at the A/D conversion unit 41, and supplied to the path detecting unit 36 and the back-diffusion unit 37 as Q signals (imaginary axis).

The path detecting unit 36 performs a PRACH preamble detection process on the signals, and reports, to the back-diffusion unit 37, the back-diffusion timings of the plural paths having different propagation channels. The back-diffusion timings are obtained when detecting the preamble signals. The preamble signals are obtained by performing a diffusion process on a particular data pattern. Therefore, the preamble may be detected by combining a matched filter with a pattern match detection circuit, for example. Furthermore, when reporting the back-diffusion timings of the plural paths, the path detecting unit 36 calculates frequency deviation initial value information (initial value information) from the preamble signals, and reports the result to a frequency deviation calculating unit (calculating unit) 42.

The back-diffusion unit 37 performs a back-diffusion process on the PRACH message signals at the plural back-diffusion timings that have been reported from the path detecting unit 36. The signals, which have been subjected to the back-diffusion process at the respective timings, are then supplied to the frequency deviation calculating unit 42, plural propagation channel estimation units 43-1 through 43-N, and plural detection processing units 44-1 through 44-N.

The frequency deviation calculating unit 42 calculates the frequency deviation with the use of pilot signals in the message signals supplied from the back-diffusion unit 37. The frequency deviation initial value information reported from the path detecting unit 36 is also used for the calculation. The frequency deviation information of the message signals obtained as a result of the calculation is reported to the propagation channel estimation units 43-1 through 43-N.

The propagation channel estimation units 43-1 through 43-N use the frequency deviation information to generate propagation channel estimation information. The detection processing units 44-1 through 44-N perform synchronization detection with the use of the propagation channel estimation information from the propagation channel estimation units 43-1 through 43-N.

The output signals of the detection processing units 44-1 through 44-N are combined in a maximum ratio combining unit 45. The combined signals are subjected to error correction at an error correction unit 46, and are then output as decoded data.

According to the above-described configuration in which the path detecting unit 36 reports the frequency deviation initial value information to the frequency deviation calculating unit 42, the frequency deviation of message signals may be corrected with improved properties.

<Path Detecting Unit According to First Embodiment>

FIG. 1 illustrates the relationship between preamble signals and message signals of PRACH in 3GPP (3rd Generation Partnership Project). The wireless base station apparatus detects preamble signals from a terminal with the use of the path detecting unit 36, and sends an Ack from a transmitting unit (not illustrated in FIG. 4) to a terminal. In response, the terminal sends a message signal. The preamble signal is of length 4096 chips.

Figure 5:
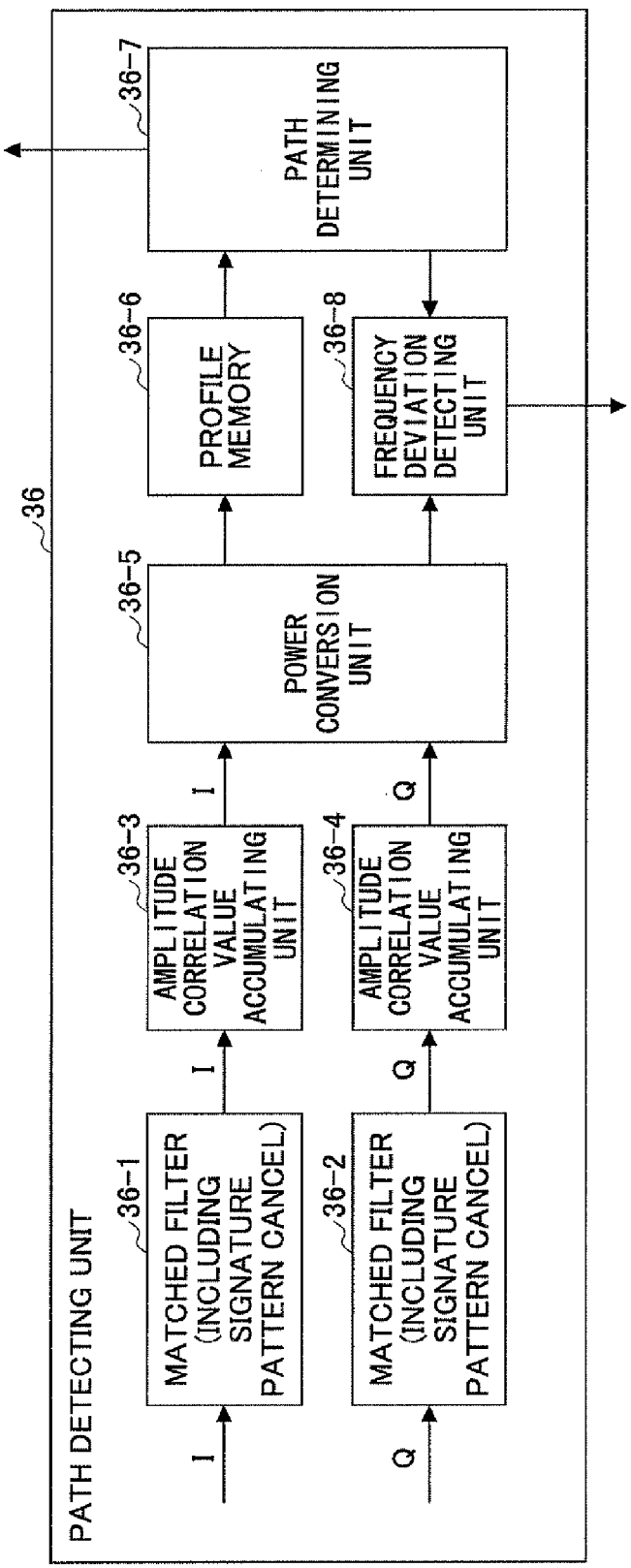
FIG. 5 illustrates a circuit configuration of a path detecting unit according to a first embodiment of the present invention.

FIG. 5 is a block diagram of the path detecting unit 36 according to a first embodiment of the present invention. As illustrated in FIG. 5, I signals and Q signals of the preamble reception data are supplied to a matched filter 36-1 and a matched filter 36-2, respectively. The I signals and Q signals are multiplied by codes that have been subjected to "scrambling code pattern cancel" and "preamble pattern cancel". Accordingly, amplitude correlation values of I signals and Q signals are obtained. The amplitude correlation values of I signals and the amplitude correlation values of Q signals are accumulated at an amplitude correlation value accumulating unit 36-3 and an amplitude correlation value accumulating unit 36-4, respectively, so that cumulative amplitude correlation values are obtained.

The cumulative amplitude correlation values of I signals and Q signals are converted into power information at a power conversion unit 36-5, and are stored in a profile memory 36-6 as preamble profiles. A path determining unit 36-7 determines that a preamble has been detected when the preamble profile (power information) stored in the profile memory 36-6 exceeds a threshold. Then, the path determining unit 36-7 sends, to the back-diffusion unit 37, a report that a preamble has been detected and the timing (one or more timings) at which the power is maximum as back-diffusion timing information.

A frequency deviation detecting unit 36-8 calculates frequency deviation initial values from cumulative amplitude correlation values of plural blocks into which the preamble has been divided, and holds the calculated values. When a report that a preamble has been detected and the timing at which the power is maximum is received from the path determining unit 36-7, the frequency deviation detecting unit 36-8 reports, to the frequency deviation calculating unit 42, the frequency deviation initial value that has been calculated at the reported timing.

Figure 6:
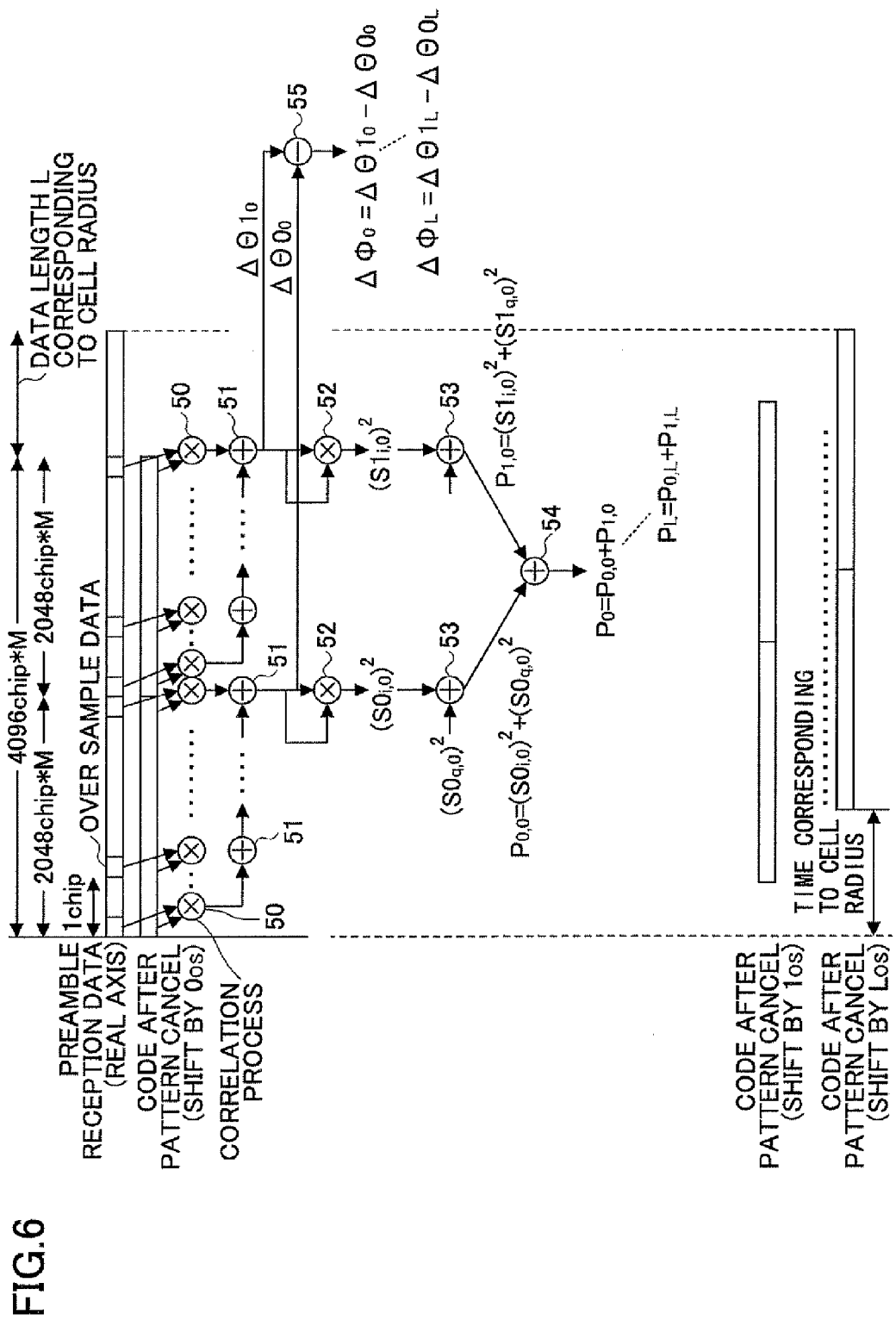
FIG. 6 illustrates a circuit configuration of the path detecting unit according to the first embodiment of the present invention.

FIG. 6 illustrates a circuit configuration of the path detecting unit 36 according to the first embodiment of the present invention. As illustrated in FIG. 6, the cumulative amplitude correlation is calculated for 4096 chips. The cumulative amplitude correlation is calculated based on codes that have been subjected to pattern cancel (cancellation) in units of chips (scrambling code pattern cancel and preamble pattern cancel) and M over sample data items of preamble reception data (real axis) output from the A/D converting unit 35.

More specifically, a multiplier 50 obtains an amplitude correlation value by multiplying a code that has been subjected to pattern cancel by M over sample data items of the preamble reception data. The amplitude correlation values are accumulated at an accumulator 51 to obtain the cumulative amplitude correlation.

The calculation of the cumulative amplitude correlation is performed on the 4096 chips at chip intervals, for a length of time (for example, 256 chips) corresponding to the cell radius L (for example, 10 km). Then, the cumulative amplitude correlation value is squared at a multiplier 52 to be subjected to power conversion. At accumulators 53 and 54, the resultant value output from the multiplier 52 is added to another value, which has been obtained in a similar manner by performing power conversion on a cumulative amplitude correlation value based on an M over sample data item of preamble reception data (imaginary axis) output from the A/D conversion unit 41. Accordingly, a preamble profile as illustrated in FIG. 7 is generated.

At the bottom of FIG. 6, a code that has been subjected to pattern cancel is shifted by one over sample (os), and a code that has been subjected to pattern cancel is shifted by L over samples.

In practical situations, in order to reduce the impact of frequency deviation and fading, the 4096 chips are divided by N, so that N amplitude information items are generated for each chip. In FIG. 6, the 4096 chips are divided by 2 (N=2).

When the 4096 chips are divided by 2, the power information $P_{0,J}$ (J=0 through L) of propagation delay 0 through L over samples of the first 2048 chips (first block) is calculated. Specifically, the calculation is performed based on cumulative amplitude correlation values ($S0_{i,J}$) of real axis components of reception signals that have been A/D converted, and cumulative amplitude correlation values ($S0_{q,J}$) of imaginary axis components of reception signals that have been A/D converted. However, L is the calculated profile length (in units of over samples), and FIG. 6 only illustrates the calculated cumulative amplitude correlation values ($S0_{i,J}$) of real axis components. $S0_{i,J}$ and $S0_{q,J}$ are stored.

$$P_{0,J} = \{(S0_{i,J})^2 + (S0_{q,J})^2\} \tag{1}$$

Next, the power information $P_{1,J}$ of propagation delay 0 through L over samples of the second 2048 chips (second block) is calculated. Specifically, the calculation is performed based on cumulative amplitude correlation values ($S1_{i,J}$) of real axis components of reception signals that have been A/D converted, and cumulative amplitude correlation values ($S1_{q,J}$) of imaginary axis components of reception signals that have been A/D converted. The power information $P_{1,J}$ of the second block is added to the power information $P_{0,J}$ of the first block.

$$P_J = P_{0,J} + \{(S1_{i,J})^2 + (S1_{q,J})^2\} \tag{2}$$

In the accumulator 54, the power information $P_{0,J}$ of the first block is sequentially added to the power information $P_{1,J}$ of the second block, starting from the $0^{th}$ over sample to the $L^{th}$ over sample, to obtain a profile expressed as $P_0=(P_{0,0}+P_{1,0})$ through $P_L=(P_{0,L}+P_{1,L})$.

In a subtractor 55, a phase $\Delta\theta 0_0 = (S0_{i,J}, S0_{q,J})$ is sequentially subtracted from a phase $\Delta\theta 1 0 = (S1i, J, S1q, J)$, starting from the $0^{th}$ over sample to the $L^{th}$ over sample, to obtain a frequency deviation $\Delta\Phi_0 (=\Delta\theta 1_0 - \Delta\theta 0_0)$ through $\Delta\Phi_L (=\Delta\theta 1_L - \Delta\theta 0_L)$ from the $0^{th}$ over sample to the $L^{th}$ over sample in the first block and the second block.

In practical situations, while the power information is obtained in the above manner, the process of detecting the maximum value of power information $P_J$ is performed, and the frequency deviation initial value information is calculated. Then, based on a maximum value Pm of the power information and a threshold (fixed value), the path detecting unit 36 determines that a preamble is detected when the maximum value Pm exceeds the threshold. Then, the path detecting unit 36 sends, to the back-diffusion unit 37, a report that a preamble has been detected and the timing at which the power is maximum as back-diffusion timing information.

Assuming that $\Delta\theta 0 m (=(S0_{i,m}, S0_{q,m}))$ and $\Delta\theta 1 m (=(S1_{i,m}, S1_{q,m}))$ are the respective phases obtained from amplitude information of the first block and the second block at a timing m when a preamble is detected and the power is maximum, the frequency deviation is $e^{\Delta\Phi m} = e^{(\Delta\theta 0 m - \Delta\theta 1 m)}$. This information $e^{\Delta\Phi m}$ is set as the frequency deviation initial value. FIGS.

8A and 8B illustrate the concept of the frequency deviation $\Delta\Phi m$ that is calculated from the phase of the first block $\Delta\theta 0m$ and the phase of the second block $\Delta\theta 1m$.

<Calculation of Frequency Deviation>

The frequency deviation may be calculated by various methods. In this example, a description is given of calculating the frequency deviation between K symbols at every slot, with the use of pilot signals of message signals. Each frame (approximately 10 msec) includes 15 slots, each slot includes 10 symbols, and each symbol includes 256 chips.

Figure 9:
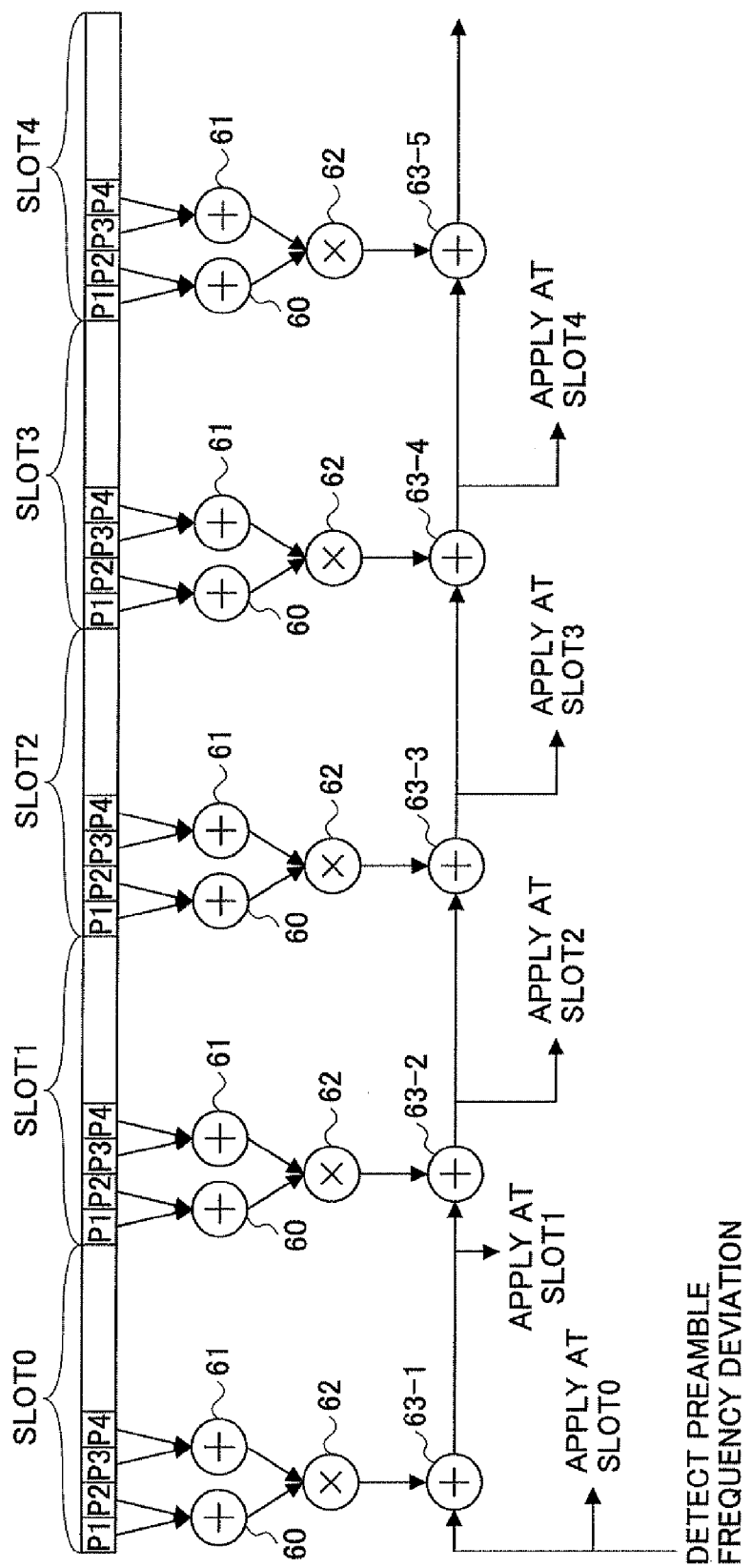
FIG. 9 illustrates a circuit configuration of a frequency deviation calculating unit according to an embodiment of the present invention.

FIG. 9 illustrates an example of a circuit configuration of the frequency deviation calculating unit 42 according to an embodiment of the present invention. As illustrated in FIG. 9, in each slot, an accumulator 60 calculates the frequency deviation between two symbols (P1, P2) of pilot signals, and an accumulator 61 calculates the frequency deviation between two symbols (P3, P4) of pilot signals. A multiplier 62 performs power conversion by multiplying the output of the accumulator 60 by the output of the accumulator 61. The frequency deviation values (power) of the zeroth to fourth slots are supplied to accumulators 63-1 through 63-5, respectively.

In the present embodiment, the frequency deviation initial value information calculated by the path detecting unit 36 is supplied to the propagation channel estimation units 43-1 through 43-N, and frequency deviation is removed from the $0^{th}$ slot of message signals. Furthermore, the frequency deviation initial value information calculated by the path detecting unit 36 is supplied to the accumulator 63-1, added to the frequency deviation initial value information of the first slot, and an average value is obtained. The output from the accumulator 63-1 is supplied to the propagation channel estimation units 43-1 through 43-N to remove the frequency deviation from the first slot of message signals.

From the second slot onward, the accumulators 63-2 through 63-5 average the frequency deviation (power). Output values from the accumulators 63-2 through 63-5 are supplied to the propagation channel estimation units 43-1 through 43-N, and the frequency deviation is removed for the second slot onward of message signals.

By removing the frequency deviation starting from the $0^{th}$ slot, the resistance of message signals with respect to frequency deviation may be increased. As the number of slots increases, the S/N is averaged based on a higher averaging parameter, and consequently the detection precision increases. By starting from the $0^{th}$ slot, the averaging parameter used for detecting the frequency deviation for the first slot increases to 2, and therefore the estimation precision of frequency deviation increases.

FIG. 9 illustrates a configuration of calculating the frequency deviation between two symbols; however, the frequency deviation may be calculated between three or four symbols. The frequency deviation that may be detected between "K" symbols is ±7500 Hz/K.

<Estimation of Propagation Channel>

Figure 10:
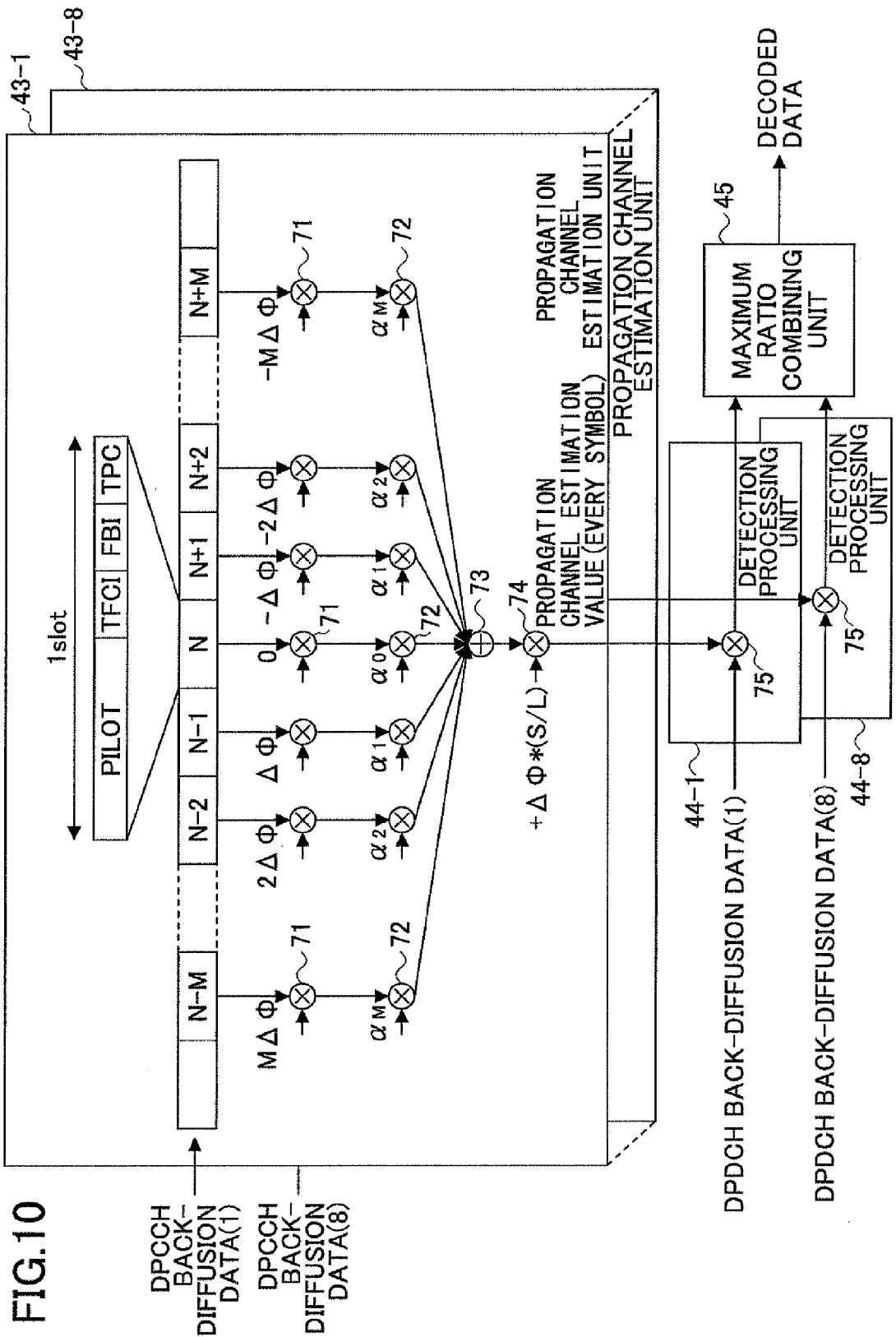
FIG. 10 illustrates a circuit configuration of propagation channel estimation units and detection processing units according to an embodiment of the present invention.

FIG. 10 illustrates a circuit configuration of the propagation channel estimation units 43-1 through 43-8 and the detection processing units 44-1 through 44-8. As illustrated in FIG. 10, the propagation channel estimation units 43-1 through 43-8 obtain the amplitude sum of pilot symbols in each slot, from the N-M slot to the N+M slot in the back-diffusion data of DPCCH (Dedicated Physical Control Channel). Then, the propagation channel estimation units 43-1 through 43-8 remove the frequency deviation between slots by performing complex multiplication on the obtained amplitude sums and the frequency deviation between the slots ($\Delta\Phi$, $\pm\Delta\Phi$, $\pm 2\times\Delta\Phi$, $\pm M\times\Delta\Phi$) with the use of a multiplier 71. The frequency deviation $\Delta\Phi$ is calculated by the frequency deviation calculating unit 42. For example, when N=4, the output from the accumulator 63-4 is the frequency deviation $\Delta\Phi$.

Subsequently, a multiplier 72 multiplies the values of the slots (from the N-M slot to the N+M slot) by weight coefficients ($\alpha 0$, $\alpha 1$, ..., $\alpha M$), to obtain the propagation channel estimation value of the N slot.

The propagation channel estimation value is obtained as follows. For example, it is assumed that the channel estimation value of the first symbol is obtained. A frequency deviation dependent on the symbol number has occurred in the slot. Therefore, a multiplier 74 performs complex multiplication [$+\Delta\Phi\times(S/L)$], so that the frequency deviation dependent on the symbol number is applied to the propagation channel estimation value. Accordingly, a propagation channel estimation value is obtained for each symbol ($\Delta\Phi$ is the frequency deviation of one slot, S is the symbol number in one slot, and L is the number of symbols in 1 slot).

Thus, in the generated propagation channel estimation value, the frequency distributions of the first to $S^{th}$ symbols of the N slot are applied. The propagation channel estimation units 43-1 through 43-8 supply the propagation estimation values to the detection processing units 44-1 through 44-8, respectively.

In each of the detection processing units 44-1 through 44-8, a multiplier 75 performs complex multiplication on the back-diffusion data of the DPDCH (Dedicated Physical Data Channel) on which the detection is performed, with the propagation channel estimation values of the symbols from the propagation channel estimation units 43-1 through 43-8. Then, the maximum ratio combining unit 45 performs maximum ratio combination to generate demodulated data.

<Path Detecting Unit According to Modification of First Embodiment>

In the above embodiment, the path detecting unit 36 only stores the amplitude information of the first block assuming that N=2, and calculates the frequency deviation initial value information with the amplitude information of the second block while detecting the maximum value. However, assuming that the preamble signal is divided into blocks by N, which is an even number of four or more, a buffer is provided for storing $^{\Delta\Phi}$ that is the same length as the profile length L.

Figure 11:
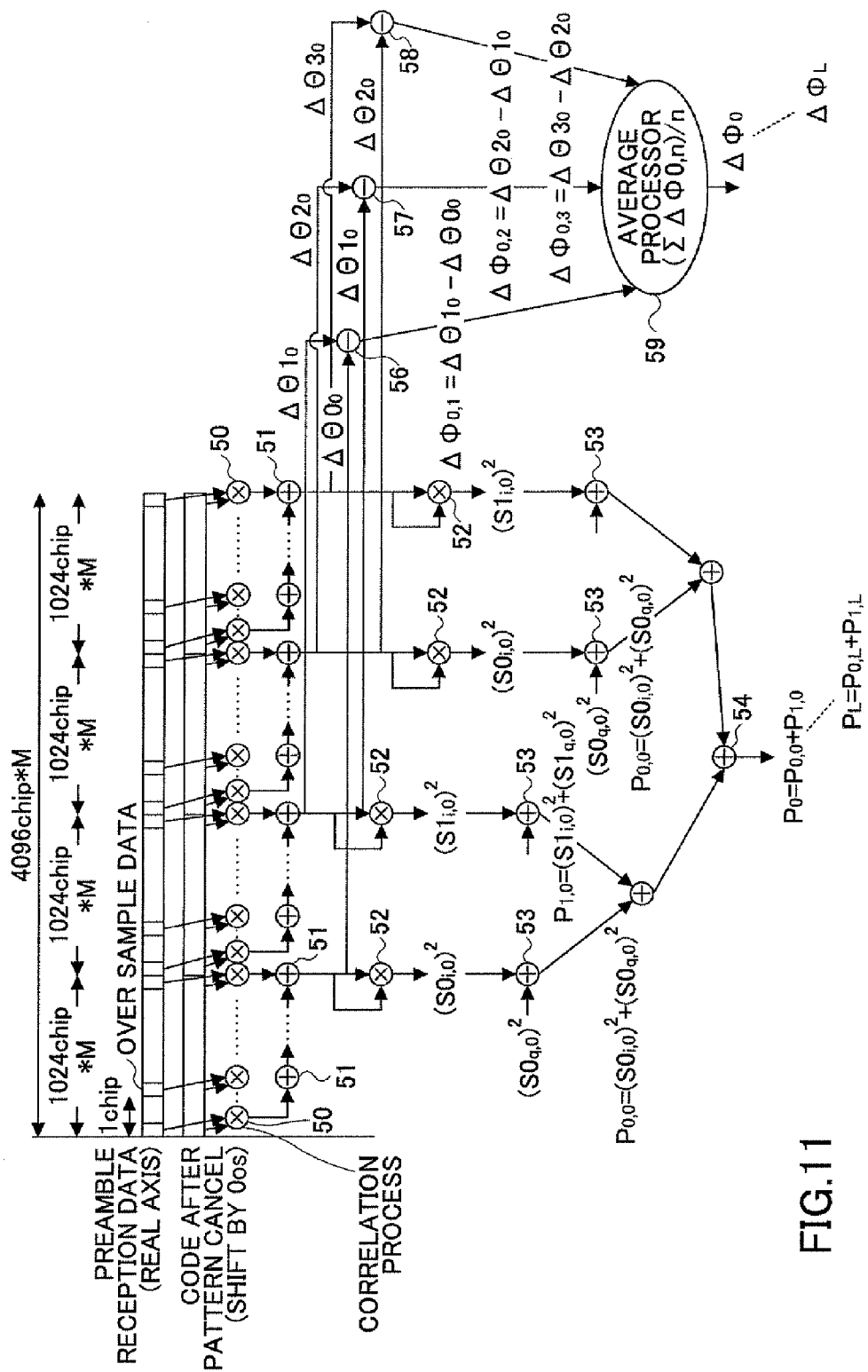
FIG. 11 illustrates a circuit configuration of a path detecting unit according to a modification of the first embodiment of the present invention.

FIG. 11 illustrates a circuit configuration of the path detecting unit 36 according to a modification of the first embodiment, where N=4. As illustrated in FIG. 11, a preamble signal of length 4096 chips is divided into four blocks (each block is of length 1024 chips). The multiplier 50 obtains an amplitude correlation value by multiplying a code that has been subjected to pattern cancel by M over sample data of the preamble reception data. The amplitude correlation values are accumulated at the accumulator 51 to obtain the cumulative amplitude correlation.

For every two blocks, the frequency deviations $\Delta\Phi_0$ through $\Delta\Phi_L$ corresponding to the profile length are calculated, and the frequency deviations are accumulated for every two blocks. That is to say, assuming that J=0 through L, a subtractor 56 sequentially subtracts the phase $\Delta\theta 0_0 = (S0_{i,J}, S0_{q,J})$ from the phase $\Delta\theta 1_0 = (S1_{i,J}, S1_{q,J})$, starting from the $0^{th}$ over sample to the $L^{th}$ over sample, to obtain $\Delta\Phi_{0,1}(=\Delta\theta 1_0 - \Delta\theta 0_0)$. Furthermore, a subtractor 57 subtracts a phase $\Delta\theta 1_0$ from a phase $\Delta\theta 2_0$ to obtain $\Delta\Phi_{0,2}(=\Delta\theta 2_0 - \Delta\theta 1_0)$. A subtractor 58 subtracts a phase $\Delta\theta 2_0$ from a phase $\Delta\theta 3_0$ to obtain $\Delta\Phi_{0,3}(=\Delta\theta 3_0 - \Delta\theta 2_0)$. An average processer 59 obtains an average value from $\Delta\Phi_{0,1}$, $\Delta\Phi_{0,2}$, and $\Delta\Phi_{0,3}$. Accordingly, the frequency deviations $\Delta\Phi_0$ through $\Delta\Phi_L$ of the $0^{th}$ over sample to the $L^{th}$ over sample are obtained.

Subsequently, similar to the case where N=2, the maximum power of the profile is calculated. If the maximum power exceeds a threshold, it is determined that a preamble has been detected, and this timing is set as the back-diffusion timing of the message signal. Furthermore, the frequency deviation information corresponding to this timing is set as the frequency deviation initial value information. In this example, the preamble signal is divided by N (an even number of four or more), and the frequency deviation information that may be detected is obtained by ±938 Hz×N÷2. 938 Hz corresponds to 4096 chips.

<Path Detecting Unit According to Another Modification of First Embodiment>

Next, a description is given of the path detecting unit 36 according to another modification of the first embodiment of the present invention. In this modification, when back-diffusion values of preamble signals are continuously accumulated, the frequency deviation initial value information of a message signal is generated from the preamble information at the same time as performing the process of detecting the maximum value of preamble detection.

Figure 12:
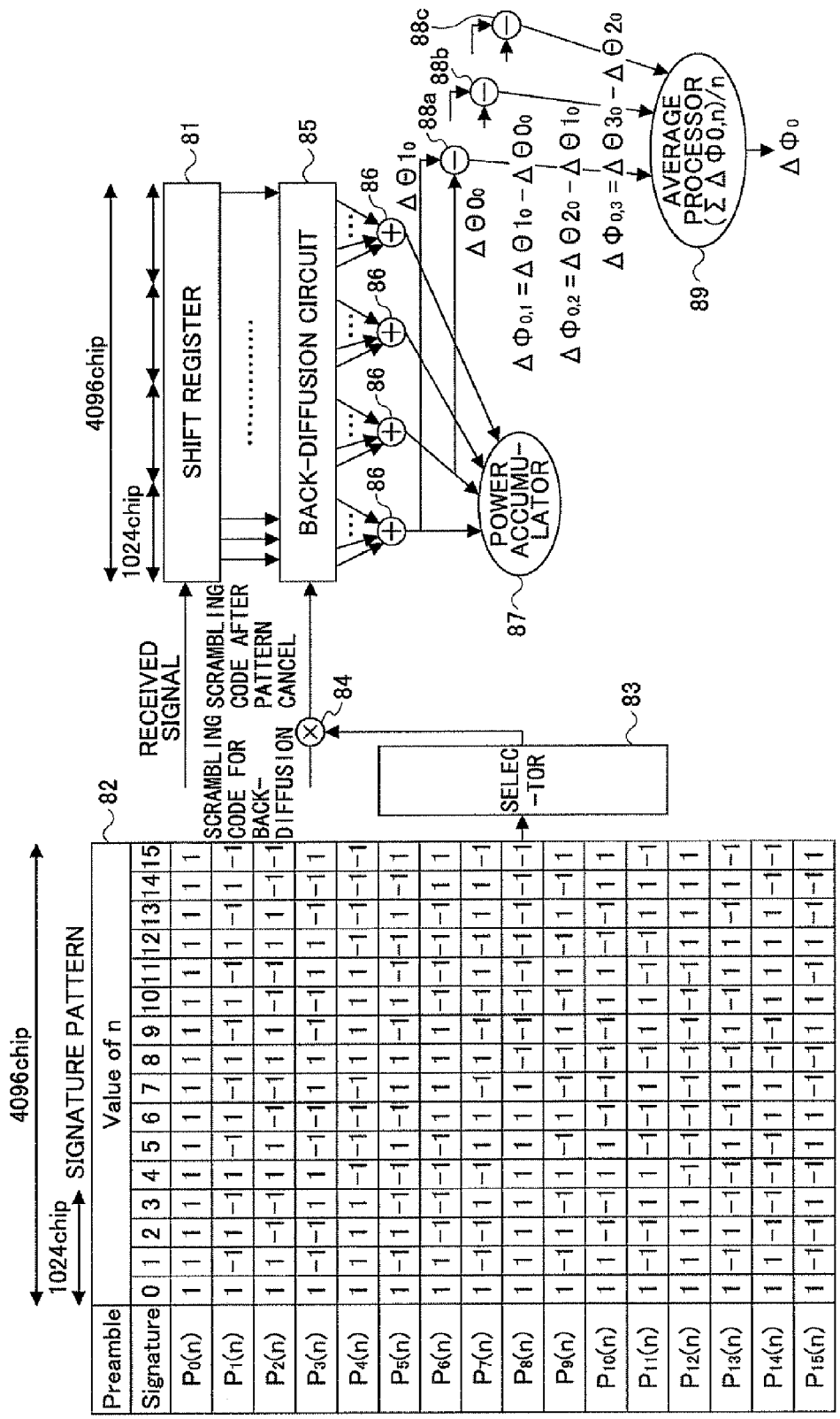
FIG. 12 illustrates a circuit configuration of a path detecting unit according to another modification of the first embodiment of the present invention.

FIG. 12 illustrates a circuit configuration of the path detecting unit 36 according to another modification of the first embodiment. As illustrated in FIG. 12, M over sample data of preamble reception data (real axis) output from the A/D converting unit 35 is received and shifted at a shift register 81.

A signature pattern table 82 stores sixteen patterns of signature patterns $P_0$ through $P_{15}$ (each pattern includes 16 symbols). In the signature pattern table 82, "1" corresponds to a value 0, and "−1" corresponds to a value 1. A selector 83 selects any one of the signature patterns $P_0$ through $P_{15}$ that is read from the signature pattern table 82, and supplies the signature pattern to a multiplier 84. The multiplier 84 multiplies the signature pattern by a scrambling code for back-diffusion. The multiplier supplies a scrambling code that has been subjected to pattern cancel to a back-diffusion circuit 85.

The back-diffusion circuit 85 performs back-diffusion processing on the preamble reception data with the scrambling code that has been subjected to pattern cancel, and obtains the amplitude correlation value at the same time as performing preamble pattern cancel.

Four accumulators 86 accumulate the amplitude correlation values to obtain cumulative amplitude correlation values. A power accumulator 87 performs power conversion on the cumulative amplitude correlation values and accumulates the cumulative amplitude correlation values, to generate a preamble profile.

Similar to FIG. 11, a subtractor 88A subtracts a phase $\Delta\theta 0_0$ from a phase $\Delta\theta 1_0$ to obtain $\Delta\Phi_{0,1}$. A subtractor 88B subtracts a phase $\Delta\theta 1_0$ from a phase $\Delta\theta 2_0$ to obtain $\Delta\Phi_{0,2}$. A subtractor 88C subtracts a phase $\Delta\theta 2_0$ from a phase $\Delta\theta 3_0$ to obtain $\Delta\Phi_{0,3}$. An average processer 89 obtains an average value from $\Delta\Phi_{0,1}$, $\Delta\Phi_{0,2}$, and $\Delta\Phi_{0,3}$. Accordingly, the frequency deviations $\Delta\Phi_0$ through $\Delta\Phi_L$ of the $0^{th}$ over sample to the $L^{th}$ over sample are obtained.

With the path detecting unit 36 according to another modification of the first embodiment, the back-diffusion circuit 85 obtains the amplitude correlation value at the same time as performing preamble pattern cancel, and therefore a simple circuit configuration is achieved.

<Path Detecting Unit According to Yet Another Modification of First Embodiment>

A description is given of the path detecting unit 36 according to yet another modification of the first embodiment of the present invention. In this modification, when back-diffusion values of preamble signals are accumulated by collectively performing pattern cancel on the same codes, frequency deviation initial value information of a message signal is generated from the preamble information.

Figure 13:
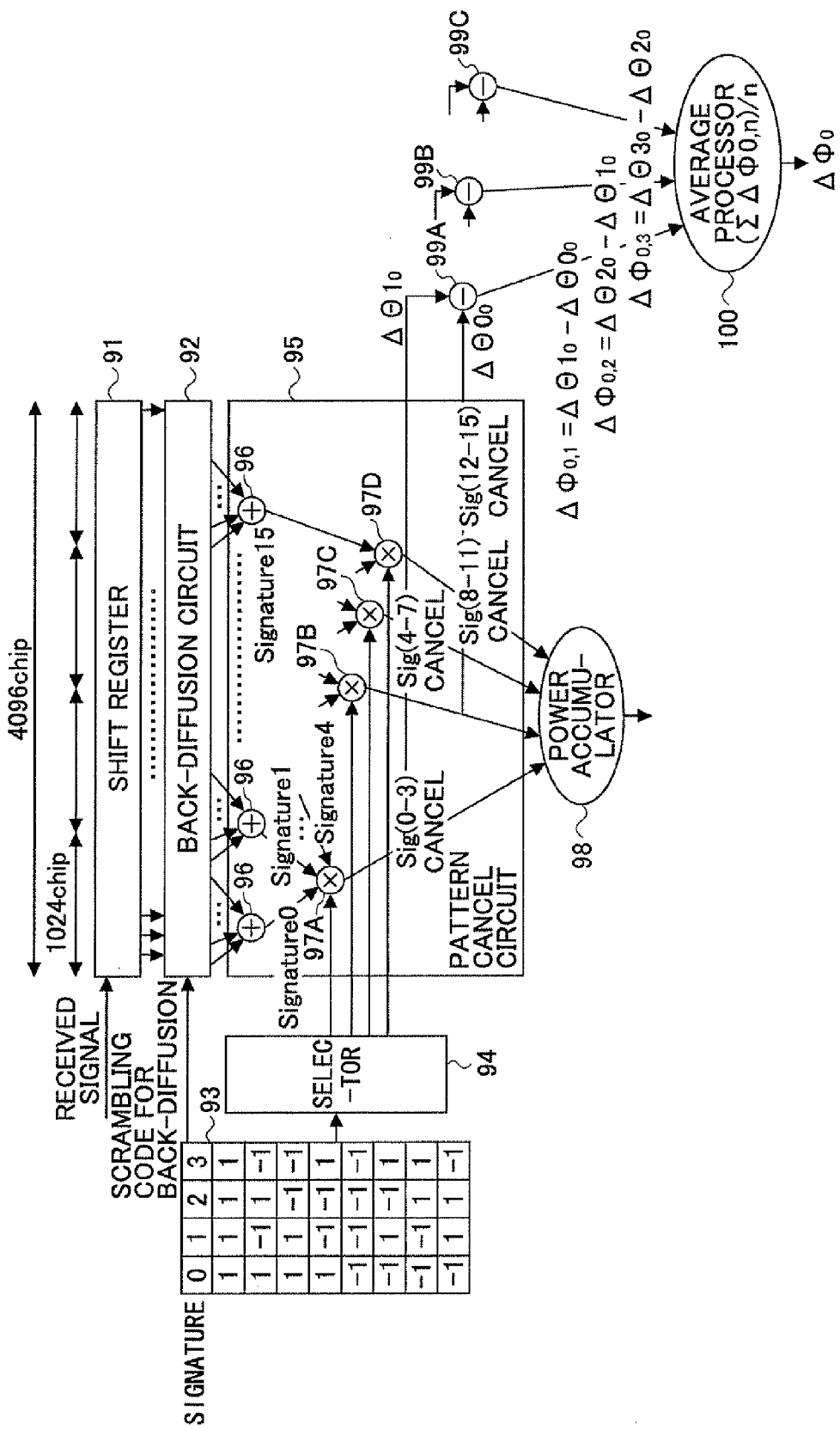
FIG. 13 illustrates a circuit configuration of a path detecting unit according to yet another modification of the first embodiment of the present invention.

FIG. 13 illustrates a circuit configuration of the path detecting unit 36 according to yet another modification of the first embodiment. As illustrated in FIG. 13, M over sample data of preamble reception data (real axis) output from the A/D converting unit 35 is received and shifted at a shift register 91. A back-diffusion circuit 92 performs back-diffusion processing on the preamble reception data with the use of a scrambling code for back-diffusion, and supplies the data to a pattern cancel circuit 95.

Sixteen patterns of signature patterns $P_0$ through $P_{15}$ (each pattern including 16 symbols) may be expressed as eight combinations of partial signature patterns, each including four symbols. Therefore, back-diffusion processing may be performed on reception signals with scrambling codes, the back-diffusion processing results may be accumulated for every 16 symbols, and the result may be divided by four to perform signature pattern cancel.

Each of the plural accumulators 96 in the pattern cancel circuit 95 accumulates the back-diffusion processing results by every 16 symbols, divides the cumulative value by four, and supplies the resultant values to multipliers 97A through 97D.

A signature pattern table 93 stores the above eight combinations of partial signature patterns (each pattern including four symbols). In the signature pattern table 93, "1" corresponds to a value 0 and "−1" corresponds to a value 1.

Four partial signature patterns that have been read from the signature pattern table 93 are sequentially selected at a selector 94 and sequentially supplied to the multipliers 97A through 97D. Partial signature patterns that have been separately selected are supplied to the respective multipliers 97A through 97D.

The multipliers 97A through 97D multiply the signature patterns of a total of 16 symbols by outputs from plural accumulators 96 in chronological order. Accordingly, cumulative amplitude correlation values are obtained, which have been subjected to preamble pattern cancel.

The cumulative amplitude correlation values obtained by the four multipliers 97A through 97D are subjected to power conversion and added together at a power accumulator 98.

Furthermore, similar to the case of FIG. 11, a subtractor 99A subtracts a phase $\Delta\theta 0_0$ from a phase $\Delta\theta 1_0$ to obtain $\Delta\Phi_{0,1}$, a subtractor 99B subtracts a phase $\Delta\theta 1_0$ from a phase $\Delta\theta 2_0$ to obtain $\Delta\Phi_{0,2}$, and a subtractor 99C subtracts a phase $\Delta\theta 2_0$ from a phase $\Delta\theta 3_0$ to obtain $\Delta\Phi_{0,3}$. An average processer 100 obtains an average value of $\Delta\Phi_{0,1}$, $\Delta\Phi_{0,2}$, and $\Delta\Phi_{0,3}$, and obtains the frequency deviations $\Delta\Phi_0$ through $\Delta\Phi_L$ of the $0^{th}$ over sample to the $L^{th}$ over sample.

<Path Detecting Unit According to Second Embodiment>

In the first embodiment, in the process of calculating the frequency deviation performed by the path detecting unit 36, the frequency deviation initial value is obtained based on the frequency deviation at a single timing at which a preamble is detected and the power is maximum. However, in reality, there may be plural timings corresponding to back-diffusion timings of message signals. Therefore, in a second embodiment according to the present invention, the frequency deviation initial value information is obtained based on an average value of frequency deviation values of all of the plural back-diffusion timings.

Figure 14:
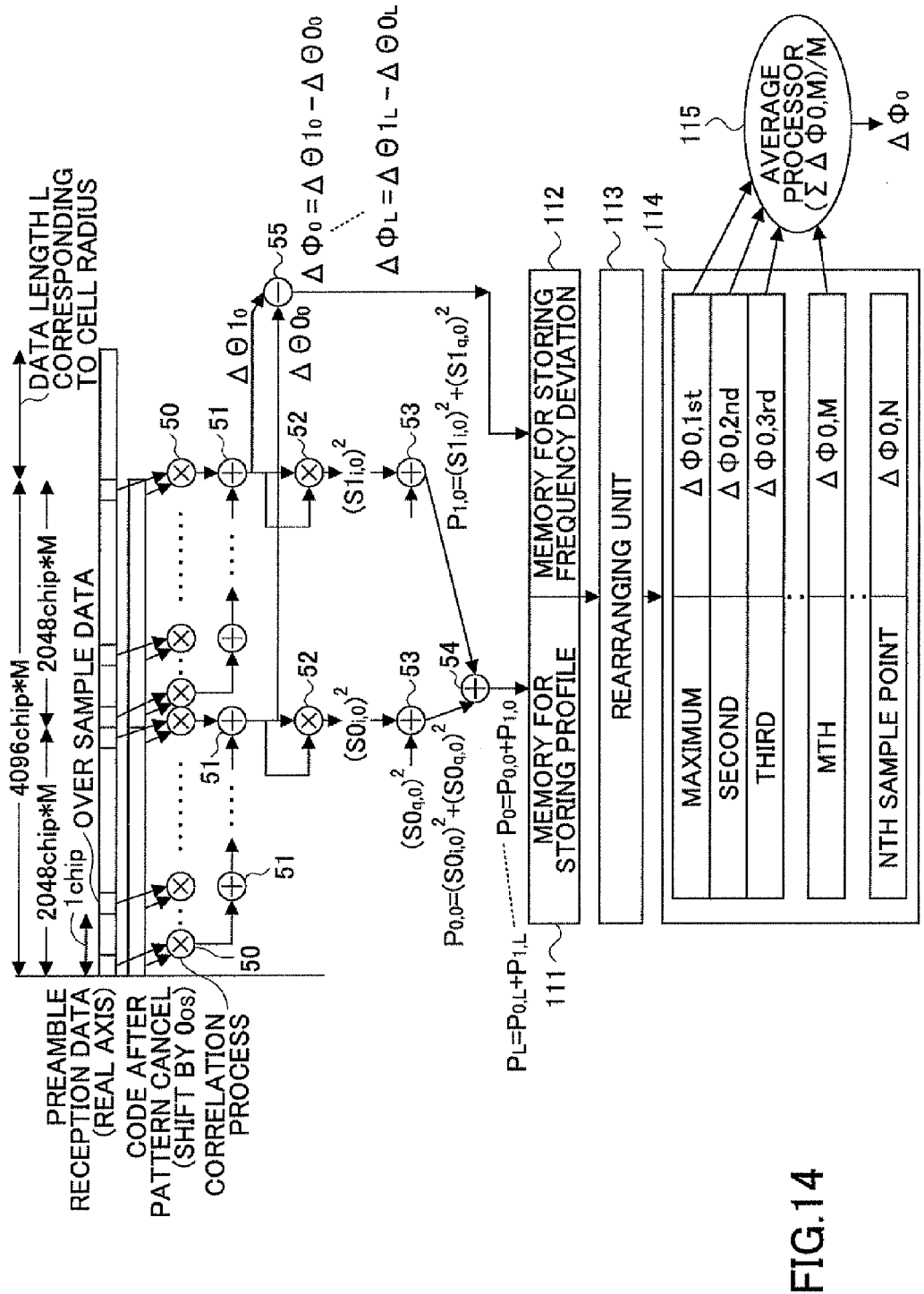
FIG. 14 illustrates a circuit configuration of a path detecting unit according to a second embodiment of the present invention.

FIG. 14 illustrates a circuit configuration of the path detecting unit 36 according to the second embodiment of the present invention. In FIG. 14, elements corresponding to those of FIG. 6 are denoted by the same reference numerals, and are not further described.

As illustrated in FIG. 14, profiles $P_0$ through $P_L$ that are output from the accumulator 54 are sequentially stored in a memory 111. Frequency deviations $\Delta\Phi_0$ through $\Delta\Phi_L$ output from the subtractor 55 are associated with the above-mentioned profiles $P_0$ through $P_L$ and sequentially stored in a memory 112.

Figure 15:
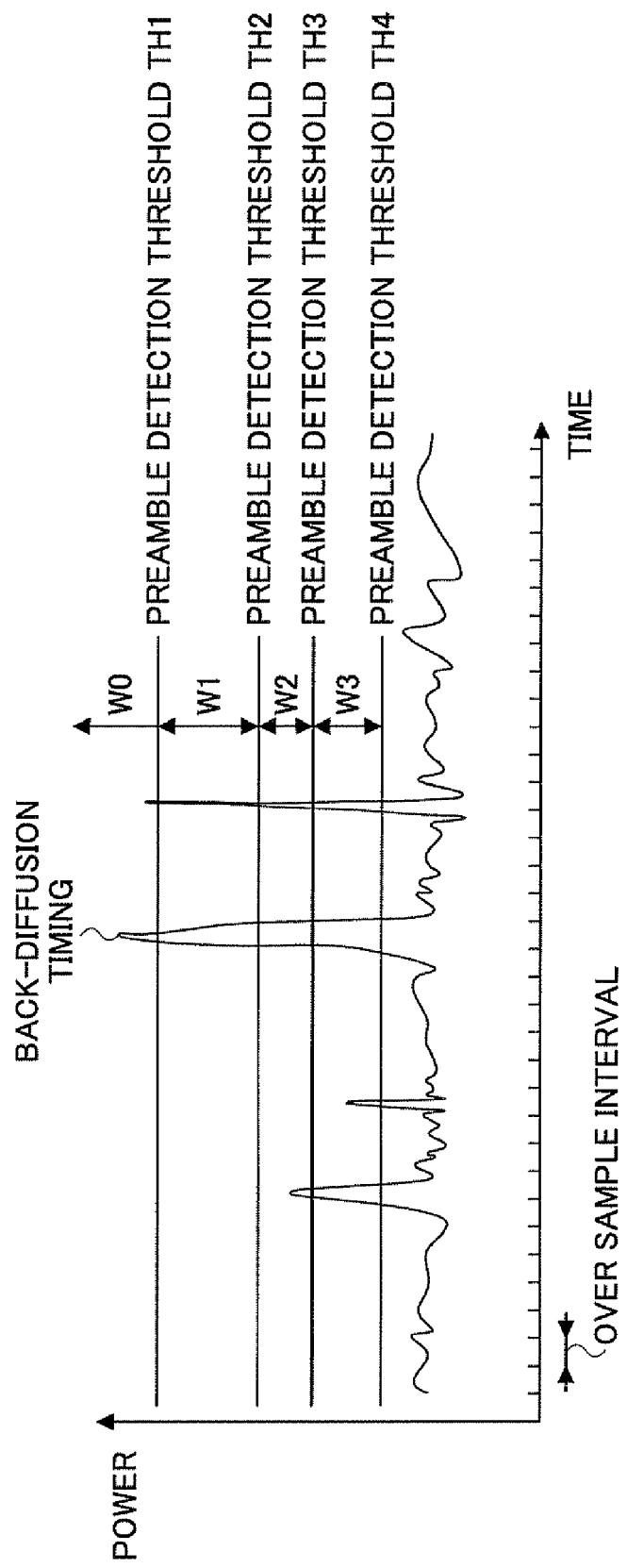
FIG. 15 illustrates another example of a preamble profile.

A rearranging unit 113 extracts plural peak values of a preamble profile as illustrated in FIG. 15, and sets the extracted peak values as sample points. The plural sample points are sorted in a descending order of the power values of the profile. At the same time, the frequency deviation values associated with the sample points are also rearranged. A block 114 indicates the sample points that have been sorted and the associated frequency deviation values.

An average processor 115 obtains the average value of frequency deviation values of the sample point at which the power is maximum to the $M^{th}$ sample point (M being 4, for example). The resulting average value is output as frequency deviation initial value information.

<Path Detecting Unit According to Modification of Second Embodiment>

Furthermore, a description is given of a modification of the second embodiment. In the modification, in order to detect the plural back-diffusion timings, plural thresholds TH1 through THn are set as illustrated in FIG. 15, and weight coefficients when combining vectors (W0, W1, W2, W3) are set for the thresholds. Accordingly, weighted frequency deviations are calculated for the frequency deviation information of the back-diffusion timings, and the weighted frequency deviations are set as frequency deviation initial value information.

Figure 16:
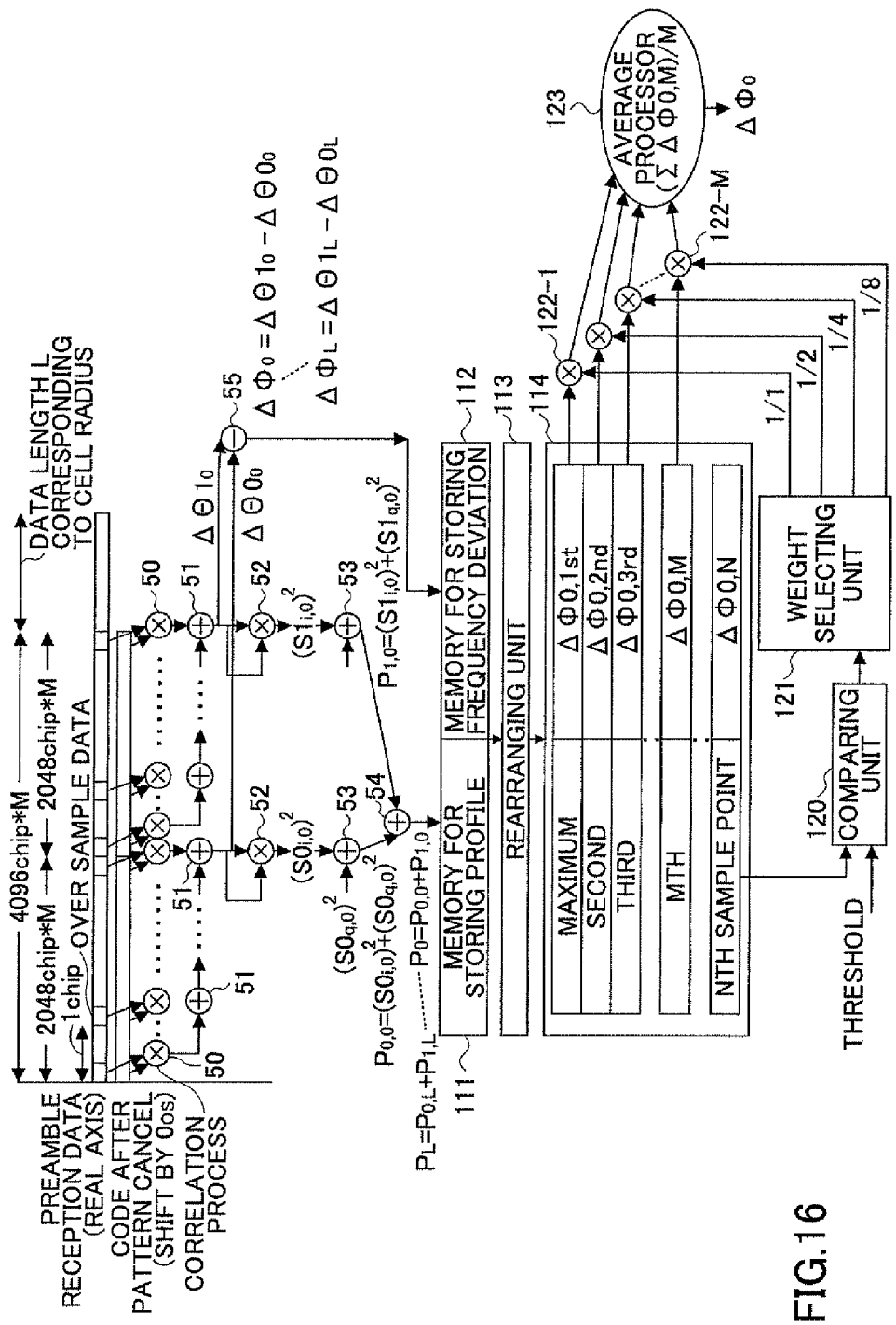
FIG. 16 illustrates a circuit configuration of a path detecting unit according to a modification of the second embodiment of the present invention.

FIG. 16 illustrates a circuit configuration of the path detecting unit 36 according to the modification of the second embodiment of the present invention. In FIG. 16, elements corresponding to those illustrated in FIG. 6 are denoted by the same reference numerals and are not further described.

In FIG. 16, profiles $P_0$ through $P_L$ that are output from the accumulator 54 are sequentially stored in the memory 111. Frequency deviations $\Delta\Phi_0$ through $\Delta\Phi_L$ output from the subtractor 55 are associated with the above-mentioned profiles $P_0$ through $P_L$ and sequentially stored in the memory 112.

The rearranging unit 113 extracts plural peak values of a profile as illustrated in FIG. 15, and sets the extracted peak values as sample points. The plural sample points are sorted in a descending order of the power values of the profile. At the same time, the frequency deviation values associated with the sample points are also rearranged. The block 114 indicates the sample points that have been sorted and the associated frequency deviation values.

A comparing unit 120 compares the power values of the rearranged sample points with the thresholds TH1 through THn indicated in FIG. 15, and supplies comparison results to a weight selecting unit 121. For example, the weight selecting unit 121 selects a weight W0=1/1 when the power value exceeds the threshold TH1, selects the weight W1=½ when the power value is less than the threshold TH1 and exceeds the threshold TH2, selects a weight W2=¼ when the power value is less than the threshold TH2 and exceeds the threshold TH3, and selects a weight W3=⅛ when the power value is less than the threshold TH3 and exceeds the threshold TH4. Then, the weight selecting unit 121 supplies the selected weights to multipliers 122-1 through 122-M. The thresholds and weights may be further increased.

The frequency deviation values of the sample point at which the power is maximum to the $M^{th}$ sample point (M being 4, for example) are read from the block 114 and supplied to the multipliers 122-1 through 122-M. The frequency deviation values are weighted at the multipliers 122-1 through 122-M and then supplied to an average processor 123.

The average processor 123 obtains the average value of the weighted frequency deviation values from the sample point at which the power is maximum to the $M^{th}$ sample point, and outputs the average value as frequency deviation initial value information.

According to the above modification, even when there is frequency deviation in signals that are transmitted in bursts, such as message signals that are transmitted after preamble signals such as PRACH, the frequency deviation is detected with high precision from the initial stages of message signals, and the detection precision of the frequency deviation improves with the passage of time, so that properties for receiving message signals are improved. Furthermore, such an effect is achieved without significantly expanding the existing circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless base station apparatus comprising:
   a path detecting unit configured to detect a preamble signal sent from a terminal and obtain a back-diffusion timing;
   a back-diffusion unit configured to execute back-diffusion processing on a message signal sent from the terminal, by using the back-diffusion timing reported from the path detecting unit; and
   a calculating unit configured to calculate a frequency deviation of the message signal that has been subjected to the back-diffusion processing, based on a pilot signal of the message signal that has been subjected to the back-diffusion processing, wherein
   the path detecting unit comprises an initial value information detecting unit configured to detect a frequency deviation of the preamble signal when the preamble signal is detected and supply the frequency deviation of the preamble signal to the calculating unit as initial value information, and
   the calculating unit comprises an initial value information adding unit that calculates the frequency deviation of the message signal by using the initial value information.

2. The wireless base station apparatus according to claim 1, wherein
   the path detecting unit obtains amplitude correlation values based on the preamble signal sent from the terminal and a code that has been subjected to pattern cancellation, divides the amplitude correlation values corresponding to a length of the preamble signal into plural blocks, and accumulates the amplitude correlation values within each of the plural blocks to calculate a cumulative amplitude correlation value for each of the plural blocks, and
   the initial value information detecting unit obtains the frequency deviation of the preamble signal based on phases of the plural blocks obtained from the cumulative amplitude correlation values of the plural blocks.

3. The wireless base station apparatus according to claim 2, wherein
the path detecting unit determines back-diffusion timings from a profile based on the cumulative amplitude correlation values corresponding to the length of the preamble signal, and
the initial value information detecting unit obtains the frequency deviation of the preamble signal based on the phases of the plural blocks at the back-diffusion timings and sets the obtained frequency deviation of the preamble signal as the initial value information.

4. The wireless base station apparatus according to claim 3, wherein
the path detecting unit obtains the amplitude correlation values corresponding to the length of the preamble signal by performing pattern cancellation on the preamble signal that has been subjected to the back-diffusion processing, wherein a signature pattern of the preamble signal is divided into plural partial signature patterns, and the pattern cancellation is collectively performed on the same partial signature patterns among the plural partial signature patterns.

5. The wireless base station apparatus according to claim 2, wherein
the path detecting unit determines plural of the back-diffusion timings by comparing a profile based on the cumulative amplitude correlation values corresponding to the length of the preamble signal with a threshold, and
obtains an average frequency deviation of the preamble signal from the frequency deviations of the preamble signal at the plural back-diffusion timings, and sets the average frequency deviation as the initial value information.

6. The wireless base station apparatus according to claim 2, wherein
the path detecting unit determines plural of the back-diffusion timings and a weight by comparing a profile based on the cumulative amplitude correlation values corresponding to the length of the preamble signal with plural thresholds, and
obtains a weighted average frequency deviation of the preamble signal from the frequency deviations of the preamble signal at the plural back-diffusion timings and the weight, and sets the weighted average frequency deviation as the initial value information.

7. The wireless base station apparatus according to claim 1, further comprising:
a propagation path estimation unit configured to perform propagation path estimation for the message signal that has been subjected to the back-diffusion processing, with the use of the frequency deviation reported from the calculating unit, wherein
the calculating unit uses the initial value information as an initial value of the frequency deviation of the message signal that has been subjected to the back-diffusion processing, and
the propagation path estimation unit performs the propagation path estimation by applying the frequency deviation reported from the calculating unit to the message signal that has been subjected to the back-diffusion processing, starting from a first slot of the message signal that has been subjected to the back-diffusion processing.

8. A frequency deviation detecting method comprising:
detecting a preamble signal sent from a terminal and obtaining a back-diffusion timing;
executing back-diffusion processing on a message signal sent from the terminal, by using the back-diffusion timing; and
calculating a frequency deviation of the message signal that has been subjected to the back-diffusion processing, based on a pilot signal of the message signal that has been subjected to the back-diffusion processing, wherein
the detecting comprises detecting a frequency deviation of the preamble signal when the preamble signal is detected and setting the frequency deviation of the preamble signal as initial value information, and
the calculating comprises calculating the frequency deviation of the message signal by using the initial value information.

9. A mobile communication system comprising a wireless base station apparatus, the wireless base station apparatus comprising:
a path detecting unit configured to detect a preamble signal sent from a terminal and obtain a back-diffusion timing;
a back-diffusion unit configured to execute back-diffusion processing on a message signal sent from the terminal, by using the back-diffusion timing reported from the path detecting unit; and
a calculating unit configured to calculate a frequency deviation of the message signal that has been subjected to the back-diffusion processing, based on a pilot signal of the message signal that has been subjected to the back-diffusion processing, wherein
the path detecting unit comprises an initial value information detecting unit configured to detect a frequency deviation of the preamble signal when the preamble signal is detected and supply the frequency deviation of the preamble signal to the calculating unit as initial value information, and
the calculating unit comprises an initial value information adding unit that calculates the frequency deviation of the message signal by using the initial value information.

* * * * *